Figure 1:
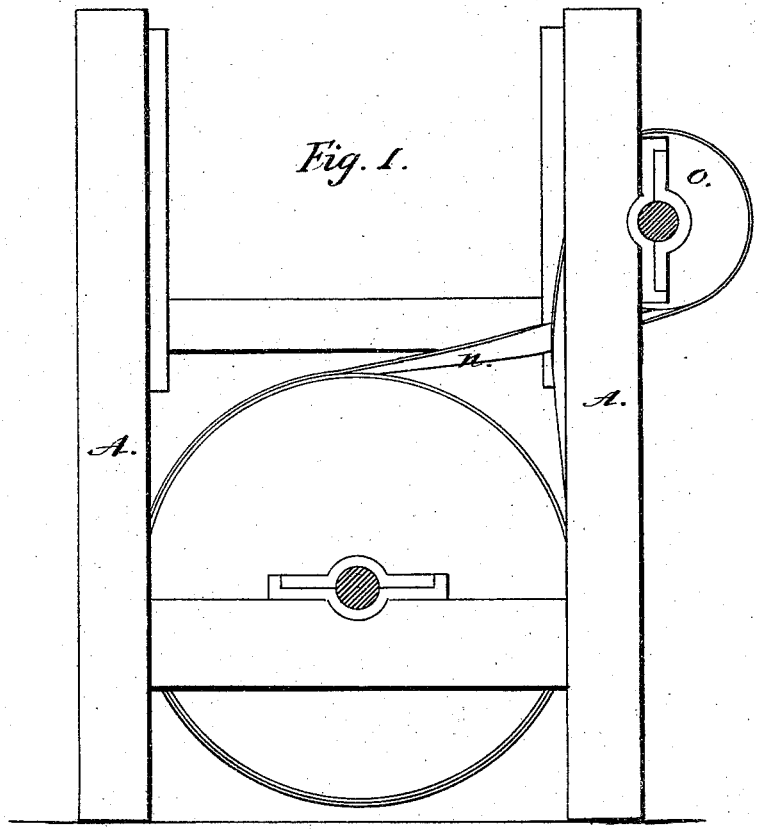

Sheet 1. 3 Sheets.

N. Reese.
Wheat-Cleaner.

117681  PATENTED AUG 1 1871

Witnesses:
Wm H Yetter
Samuel Knorr

Nehemiah Reese
Inventor;

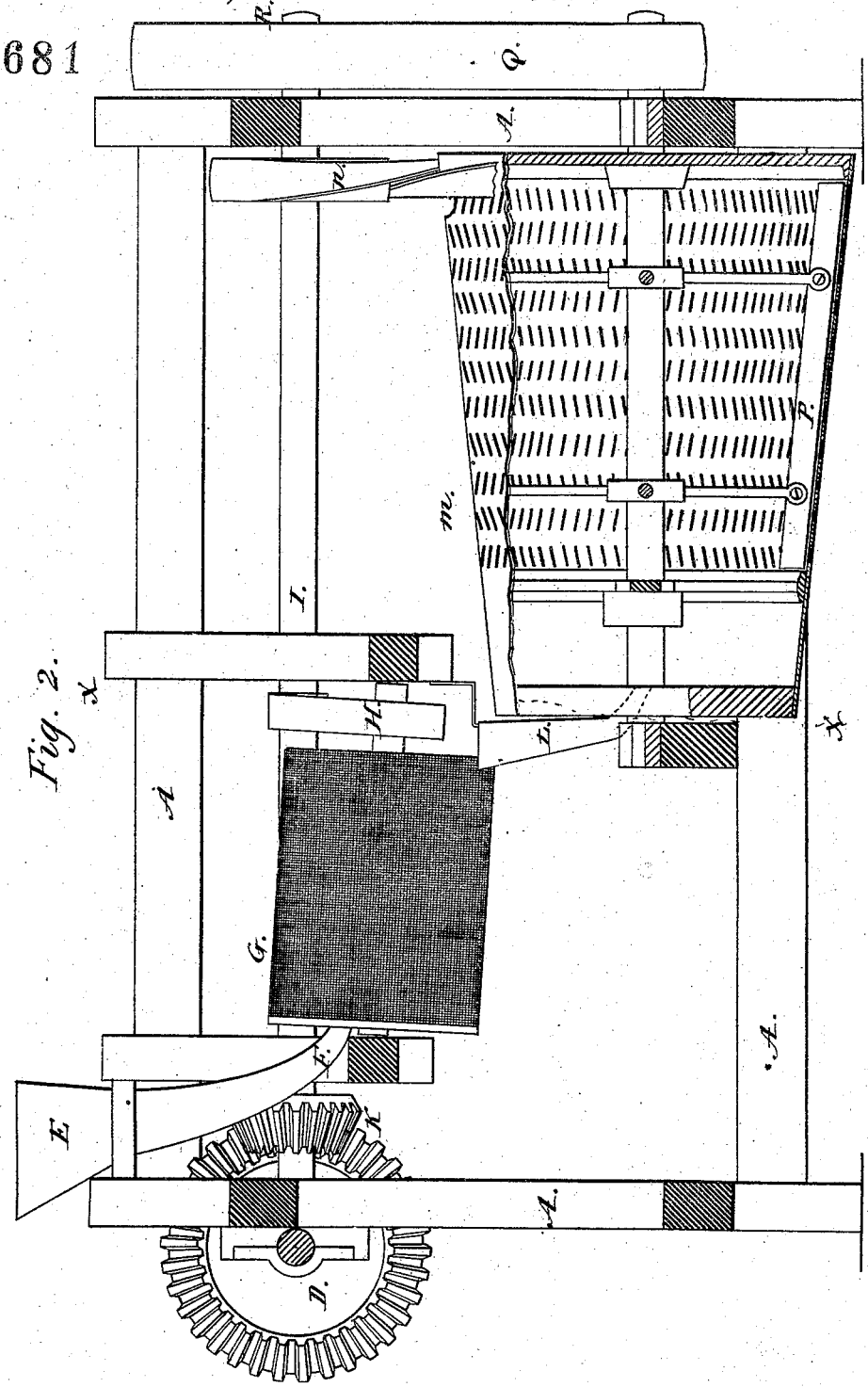

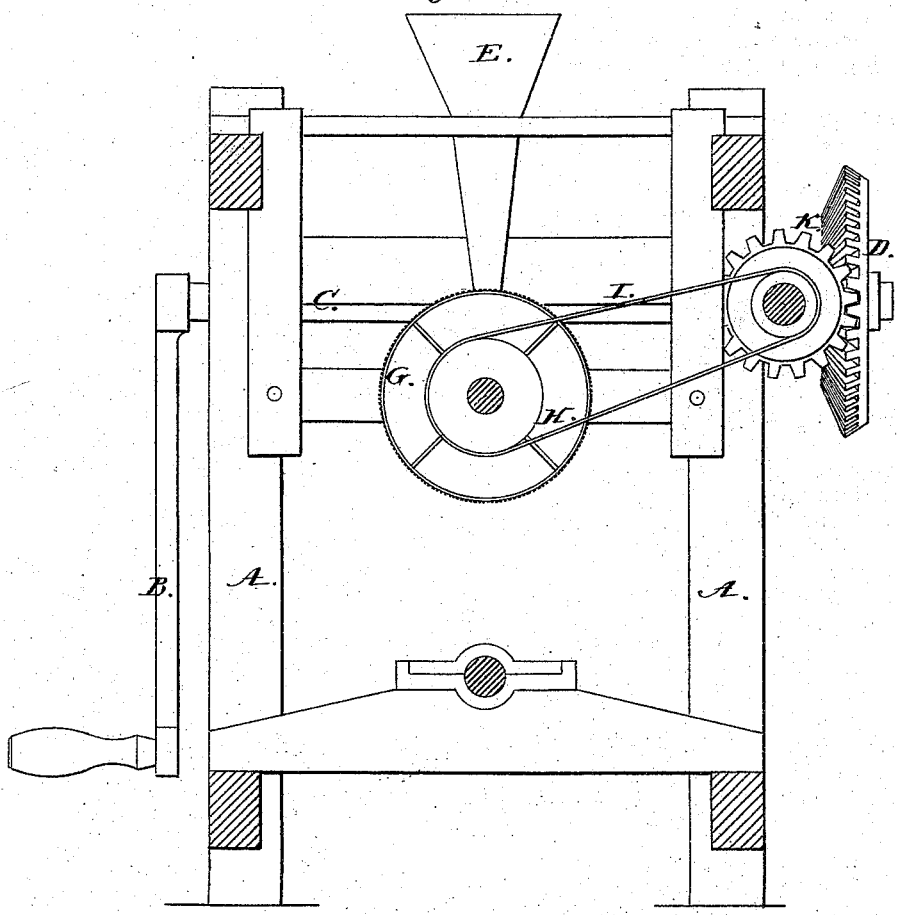

UNITED STATES PATENT OFFICE.

NEHEMIAH REECE, OF HEMLOCK TOWNSHIP, PENNSYLVANIA.

IMPROVEMENT IN MACHINES FOR CLEANING GRAIN.

Specification forming part of Letters Patent No. 117,681, dated August 1, 1871.

*To all whom it may concern:*

Be it known that I, NEHEMIAH REECE, of Hemlock township, in the county of Columbia and State of Pennsylvania, have invented a Machine for the Cleaning, Drying, and the Preparation of Wheat for Grinding, of which the following is a specification:

The first part of my invention so combines a hopper or other vessel, into which wheat and water are poured, with a revolving screen, by means of an outlet from the hopper into the screen, not capable of carrying off the wheat and water as fast as the same are poured into the hopper, that the wheat, being heavier, runs off through the outlet, and the smut, oats, or other impurities, run off at the top of the hopper with the overflowing water. The second part of my invention dries the wheat by means of an inclined revolving screen combined with a perforated revolving cylinder having internal fans, the cylinder and fans being turned in opposite directions, the screen allowing the water to escape and carrying the wheat into the perforated cylinder, where it is dried by the cylinder and fans.

Figure 1 shows a part of that end of the machine which is at the right hand in Fig. 2. Fig. 2 shows a side view of a machine embodying my invention, and also shows the internal fans in the revolving cylinder. Fig. 3 shows a transverse section of those parts of the machine which are at the left hand of line *x x*, drawn across Fig. 2.

A is the frame-work of the machine, which should be substantially constructed. B is the handle or driving-wheel, connected by the shaft C to the cog-wheel D, from which motion is communicated to all parts of the machine. E is the hopper into which the wheat and water are placed. F is the outlet from the hopper E to the screen G, which outlet, being small, causes the water with the impurities to pass off at the top of the hopper, while the wheat, being heavier, sinks to the bottom and passes through the outlet into the screen G, which, revolving, carries off through its sides what water may have passed into it with the wheat, and, being inclined, carries the wheat through hopper L into cylinder M. Screen G is made to revolve by belt H attached to shaft I, which, by means of cog-wheel K, is turned by cog-wheel D. The cylinder M is turned by belt N, attached by wheel O to shaft I, and revolves in one direction, while its internal fans P are, by belt Q attached to shaft I, made to revolve in the opposite direction. The wheat, by means of the inclined cylinder and fans, becomes perfectly dry, and escapes through the holes in the sides of the cylinder at the end furthest from the place where the wheat entered the cylinder.

I claim as my invention and desire to secure by Letters Patent—

The hoppers E and L, revolving screen G, perforated revolving cylinder M, and fans P, when said parts are constructed, combined, and arranged for operation, substantially as and for the purpose described.

NEHEMIAH REECE.

Witnesses:
 WM. VL. YETTER,
 SAMUEL KNORR.